(12) United States Patent
Tanaka

(10) Patent No.: US 9,467,541 B2
(45) Date of Patent: Oct. 11, 2016

(54) PORTABLE TERMINAL DEVICE

(71) Applicant: NEC CASIO Mobile Communications, Ltd, Kawasaki-shi, Kanagawa (JP)

(72) Inventor: Rie Tanaka, Kawasaki (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/429,281

(22) PCT Filed: Mar. 14, 2013

(86) PCT No.: PCT/JP2013/001733
§ 371 (c)(1),
(2) Date: Mar. 18, 2015

(87) PCT Pub. No.: WO2014/049899
PCT Pub. Date: Apr. 3, 2014

(65) Prior Publication Data
US 2015/0222735 A1   Aug. 6, 2015

(30) Foreign Application Priority Data
Sep. 25, 2012   (JP) ................. 2012-211290

(51) Int. Cl.
*H04M 1/02*   (2006.01)
*G02F 1/1333*   (2006.01)
*G06F 1/16*   (2006.01)
*H04M 1/18*   (2006.01)

(52) U.S. Cl.
CPC ...... *H04M 1/0266* (2013.01); *G02F 1/133308* (2013.01); *G06F 1/1626* (2013.01); *H04M 1/0214* (2013.01); *H04M 1/185* (2013.01); *H04M 2250/22* (2013.01)

(58) Field of Classification Search
CPC . G06F 1/1626; H04M 1/0266; H04M 1/185; H04M 1/0214; H04M 2250/22; G02F 1/133308; G02F 1/1333; G09F 9/00; G09F 9/40
See application file for complete search history.

(56) References Cited

U.S. PATENT DOCUMENTS

| 8,761,836 B2 | 6/2014 | Joo | |
| 2008/0316116 A1* | 12/2008 | Hobson | H01Q 1/243 343/702 |
| 2009/0005132 A1* | 1/2009 | Ogatsu | B29C 45/14336 455/575.3 |

(Continued)

FOREIGN PATENT DOCUMENTS

| CN | 102256455 A | 11/2011 |
| JP | 2009-022049 A | 1/2009 |

(Continued)

OTHER PUBLICATIONS

International Search Report for PCT Application No. PCT/JP2013/001733, mailed on Jun. 4, 2013.

(Continued)

*Primary Examiner* — Kenneth Lam

(57) ABSTRACT

A portable terminal device (1) according to the present invention includes a housing (11), a display panel (14), a resin material, and a metal material. The display panel (14) is disposed on a principal surface (100a) of the housing (11). The metal material is disposed on a side wall (112a) of the housing (11). The resin material is disposed at ends of the housing (11), the ends sandwiching the side wall (112a) in a longitudinal direction of the side wall (112a). The metal material has a strength higher than that of the resin material.

13 Claims, 9 Drawing Sheets

(56) References Cited

U.S. PATENT DOCUMENTS

| | | | |
|---|---|---|---|
| 2009/0079895 A1* | 3/2009 | Kobayashi | H04M 1/0214 349/58 |
| 2009/0268120 A1* | 10/2009 | Ogatsu | H04M 1/0202 349/58 |
| 2010/0137043 A1* | 6/2010 | Horimoto | H04M 1/236 455/575.7 |
| 2011/0287812 A1* | 11/2011 | Joo | H04M 1/185 455/566 |
| 2012/0224338 A1 | 9/2012 | Park | |
| 2013/0076597 A1* | 3/2013 | Becze | G06F 3/1438 345/1.3 |
| 2013/0203462 A1* | 8/2013 | Tahk | G06F 3/04845 455/556.1 |

FOREIGN PATENT DOCUMENTS

| | | |
|---|---|---|
| JP | 2009-288671 A | 12/2009 |
| JP | 2010-136017 A | 6/2010 |
| JP | 2010-224291 A | 10/2010 |
| JP | 2011-191600 A | 9/2011 |
| JP | 2012-156768 A | 8/2012 |
| JP | 2012-227567 A | 11/2012 |

OTHER PUBLICATIONS

Chinese Office Action for CN Application No. 201380049651.3 issued on Jul. 25, 2016 with English Translation.

* cited by examiner

PORTABLE TERMINAL DEVICE

This application is a National Stage Entry of PCT/JP2013/001733 filed on Mar. 14, 2013, which claims priority from Japanese Patent Application 2012-211290 filed on Sep. 25, 2012, the contents of all of which are incorporated herein by reference, in their entirety.

TECHNICAL FIELD

The present invention relates to a portable terminal device, and more particularly, to a portable terminal device including a display unit.

BACKGROUND ART

In recent years, portable terminal devices such as cellular phones and smartphones have been in widespread use. Particularly, there is a demand for increasing the screen size of a display unit of each smartphone.

Patent Literature 1 discloses an electronic device in which a side wall of a front case is formed using a resin material.

CITATION LIST

Patent Literature

[Patent Literature 1] Japanese Unexamined Patent Application Publication No. 2009-288671

SUMMARY OF INVENTION

Technical Problem

The width of a frame surrounding a display unit is narrowed by thinning the side walls of a portable terminal device, thereby making it possible to increase the screen size of the display unit of the portable terminal device. However, thinning of the side walls that are formed of a resin material causes a problem that a sufficient strength cannot be ensured.

In view of the above-mentioned problem, an object of the present invention is to provide a portable terminal device by which a narrower frame width can be achieved while the strength of the portable terminal device is ensured.

Solution to Problem

An exemplary aspect of the present invention is a portable terminal device including: a housing; a display unit disposed on a first surface of the housing; a first member disposed on a first side surface of the housing; and a second member disposed at ends of the housing, the ends sandwiching the first side surface in a longitudinal direction of the first side surface. The first member has a strength higher than that of the second member.

Advantageous Effects of Invention

According to the present invention, it is possible to provide a portable terminal device by which a narrower frame width can be achieved while the strength of the portable terminal device is ensured.

DESCRIPTION OF EMBODIMENTS

First Exemplary Embodiment

Exemplary embodiments of the present invention will be described below with reference to the drawings.

Figure 1:
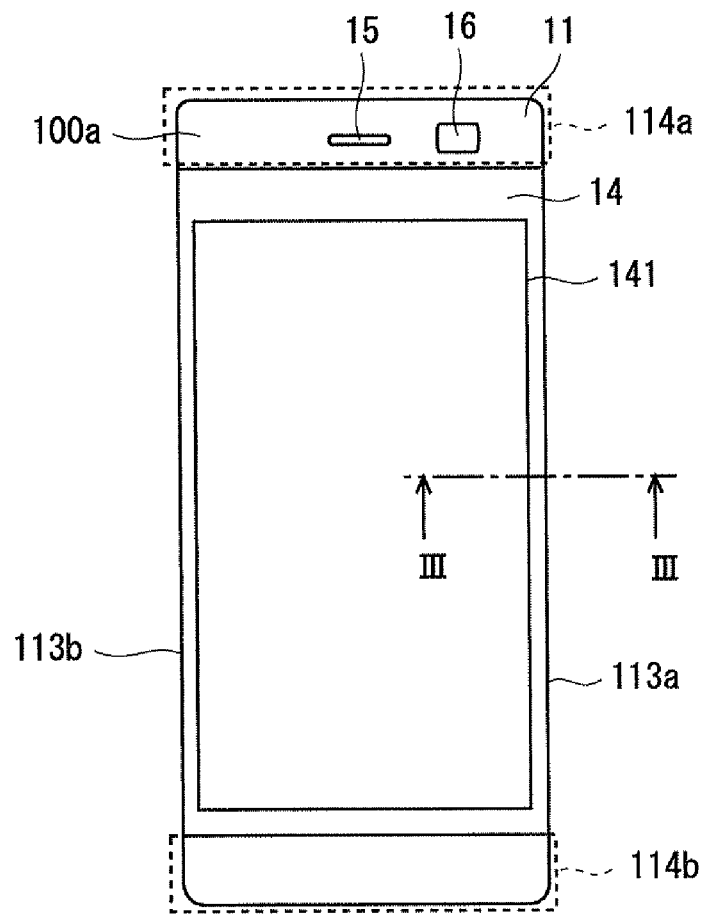
FIG. 1 is a plan view showing a portable terminal device according to a first exemplary embodiment.
Figure 2:
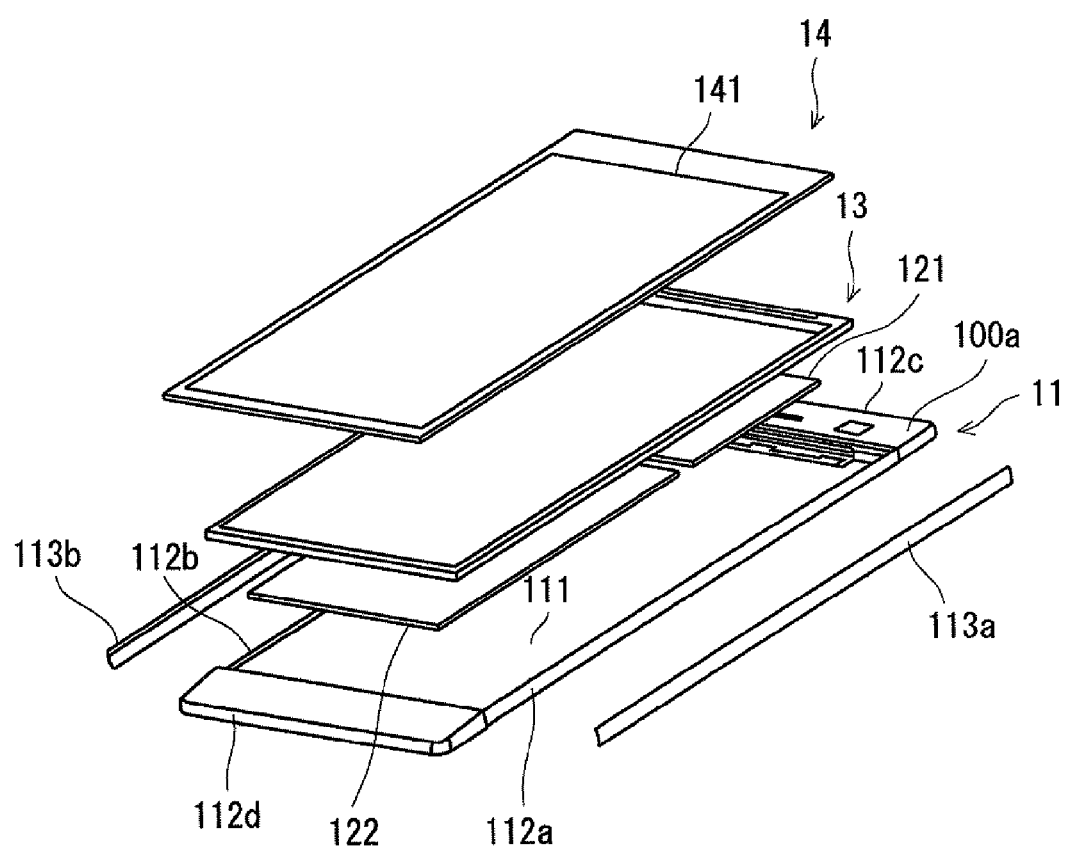
FIG. 2 is an exploded perspective view showing the portable terminal device according to the first exemplary embodiment.

FIG. 1 is a front view showing a portable terminal device 1 according to this exemplary embodiment. FIG. 2 is an exploded perspective view showing the portable terminal device 1. Note that the portable terminal device 1 according to this exemplary embodiment is, for example, a smartphone, a tablet portable terminal device, a cellular phone, a game console, or an electronic book terminal.

<Overall Structure of Portable Terminal Device 1>

Referring first to FIGS. 1 and 2, the overall structure of the portable terminal device 1 will be described. The portable terminal device 1 according to this exemplary embodiment includes a housing 11, a substrate 121, a battery 122, a liquid crystal portion 13, a display panel 14, a receiver 15, and a proximity sensor 16.

The housing 11 is structured to be able to accommodate the substrate 121, the battery 122, the liquid crystal portion 13, and the display panel 14. As shown in FIGS. 1 and 2, the housing 11 includes a housing body 111 having a substantially rectangular shape, side walls 112a to 112d, side plates 113a and 113b, and antenna areas 114a and 114b. The housing 11 accommodates the substrate 121, the battery 122, the liquid crystal portion 13, and the display panel 14 on the housing body 111. The housing 11 is formed using a resin material. In other words, the housing body 111 and the side walls 112a to 112d are formed using a resin material (second member). The side walls 112a to 112d may contain other materials, as long as the side walls 112a to 112d contain the resin material as a major component.

The side walls 112a and 112b are side walls extending in the longitudinal direction of the housing 11. That is, the side wall 112b is opposed to the side wall 112a. The side walls 112c and 112d are side walls extending in the lateral direction of the housing 11. That is, the side wall 112d is opposed to the side wall 112c. The side walls 112c and 112d are side walls sandwiching the side walls 112a and 112b.

The side plate 113a is located on the outer surface of the side wall 112a. In other words, the portable terminal device 1 includes the side plate 113a disposed on a side surface (first side surface) located on the side wall 112a side thereof. The side plate 113b is located on the outer surface of the side wall 112b. In other words, the portable terminal device 1 includes the side plate 113b disposed on a side surface (second side surface) located on the side wall 112b side thereof. The side surface located on the side wall 112b side of the portable terminal device is opposed to the side surface located on the side wall 112a side thereof. The side plates 113a and 113b are formed using a metal material (first member) having a strength higher than that of the resin material. The side plates 113a and 113b may contain other materials, as long as the side plates 113a and 113b contain the metal material as a major component.

The side plate 113a is located on a portion corresponding to the display panel 14 on the side surface located on the side wall 112a side of the portable terminal device. Specifically, the side plate 113a extends on the outer surface of the side wall 112a along the longitudinal direction of the display panel 14. In other words, the length of the display panel 14 in the longitudinal direction of the housing 11 is substantially the same as the length of the side plate 113a in the longitudinal direction.

On the other hand, both ends (i.e., an end located on the side wall 112c side of the portable terminal device 1 and an end located on the side wall 112d side of the portion terminal device 1) which sandwich the side wall 112a in the longitudinal direction of the side wall 112a are formed of the resin material. Accordingly, in a plan view, the side wall 112a includes the metal material (side plate 113a) in a portion located on a side of the display panel 14, and includes the resin material in portions located on an upper side and a lower side of the display panel 14. The side wall 112b and the side plate 113b have a structure similar to that of the side wall 112a and the side plate 113a.

The housing 11 includes the antenna area 114a (portion indicated by the broken line in FIG. 1) on the upper side of the display panel 14 in a plane view. The housing 11 also includes the antenna area 114b (portion indicated by the broken line in FIG. 1) on the lower side of the display panel 14 in a plan view. In other words, the antenna areas 114a and 114b sandwich the display panel 14 in the longitudinal direction of the housing 11. The antenna areas 114a and 114b each accommodate an antenna (not shown).

In the side wall 112a, the resin material is located at the portions respectively corresponding to the antenna areas 114a and 114b. The housing 11 includes the resin material in the side walls 112c and 112d. Accordingly, the side walls around the antenna areas 114a and 114b are formed of the resin material. The antenna areas 114a and 114b on a principal surface 100a are also formed of the resin material. In other words, the peripheral area of the antenna areas 114a and 114b does not include the metal material that has an adverse effect on the communication quality of antennas. As a result, the portable terminal device 1 can suppress deterioration in the communication quality of antennas.

The substrate 121 includes circuit elements (not shown). Examples of the circuit elements include circuits for controlling integrated circuit devices, such as a processor for driving the portable terminal device 1, a memory, a communication module, and the liquid crystal portion 13. The battery 122 supplies electric power to the substrate 121.

The liquid crystal portion 13 is an LCD (Liquid Crystal Display) that displays images based on the control of the substrate 121. The display panel 14 (display unit) is located on the principal surface 100a of the portable terminal device 1. The display panel 14 is formed of, for example, glass. The display panel 14 may be a touch panel having a touch sensor function. An active area 141 is an area in which images are actually displayed by the liquid crystal portion 13.

The portable terminal device 1 includes the receiver 15 and the proximity sensor 16 in the antenna area 114a. The receiver 15 is a speaker that outputs the voice of a caller during a call. The proximity sensor 16 detects that an object (for example, an ear of a user) has come closer to the portable terminal device 1 during a call. When the proximity sensor 16 detects that the object has come closer to the portable terminal device 1, the substrate 121 stops an input operation on the touch panel.

<Detailed Structure of Side Wall 112a>

Figure 3:
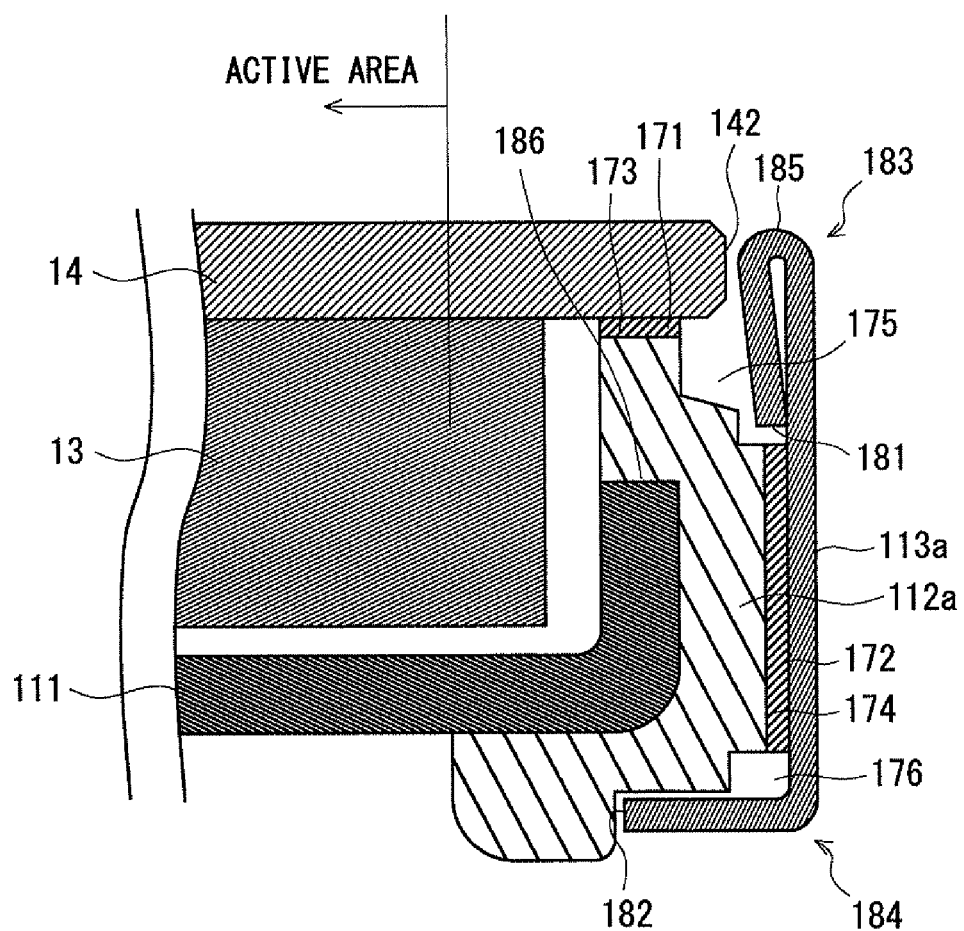
FIG. 3 is a sectional view showing a side wall of the portable terminal device according to the first exemplary embodiment.

Next, the structure of the side wall 112a of the housing 11 will be described in detail with reference to FIG. 3 FIG. 3 is a sectional view taken along the line III-III of FIG. 1. In other words, FIG. 3 is a sectional view showing the side wall 112a and the side plate 113a in the lateral direction.

As shown in FIG. 3, the liquid crystal portion 13 and the display panel 14 are located on the housing body 111. The housing body 111 is formed of an insert metal plate. At this time, the back surface (surface opposite to the display panel 14) of the housing body 111 corresponds to the back surface of the portable terminal device 1. In other words, the insert metal plate (housing body 111) is exposed on the back surface of the portable terminal device 1.

An end 186 of the housing body 111 on the side wall 112a side is directed upward toward the display panel 14. Although not shown, an end of the housing body 111 on the side wall 112b side is also directed toward the display panel 14. The housing body 111 and the side walls 112a and 112b are joined together by, for example, insert molding, and thus are integrally formed.

The display panel 14 is joined to the upper surface (adhesive surface 173) of the side wall 112a with an adhesive 171. The side plate 113a is joined to the outer surface (adhesive surface 174) of the side wall 112a with an adhesive 172.

A clearance 175 is present on the side plate 113a side relative to the adhesive surface 173. In other words, the clearance 175 is present between the display panel 14 and the side wall 112a. Thus, the excess adhesive 171 is pushed out into the clearance 175 when the display panel 14 and the side wall 112a are joined together. Accordingly, in the portable terminal device 1, if an excess amount of adhesive 171 is applied, the excess adhesive 171 can be introduced into the clearance 175. For this reason, the manufacturer can apply a larger amount of adhesive 171 than that required for the joining process onto the adhesive surface 173 during the joining process. As a result, the display panel 14 and the side wall 112a are joined together with a sufficient adhesive force. The severity of the requirement regarding the amount of the adhesive 171 to be applied is lessened as compared with a structure including no clearance. This leads to simplification of the working process for the portable terminal device 1.

In the thickness direction of the housing 11, the clearance 175 and a clearance 176 are present on both sides of the adhesive surface 174 between the side plate 113a and the side wall 112a. In other words, the clearances 175 and 176 are present between the side plate 113a and the side wall 112a. Thus, the excess adhesive 172 is pushed out into the clearances 175 and 176 when the side plate 113a and the side wall 112a are joined together. For this reason, the manufacturer can apply a larger amount of adhesive 172 than that required for the joining process onto the adhesive surface 174 during the joining process. As a result, the side plate 113a and the side wall 112a are joined together with a sufficient adhesive force. Note that a double-sided tape may be used for the adhesive surfaces 173 and 174 during the joining process.

At this time, the clearance 175 functions as a clearance (first clearance) for the adhesive 171 to be pushed out of the adhesive surface 173, and also functions as a clearance (second clearance) for the adhesive 172 to be pushed out of the adhesive surface 174. That is, the clearance for the adhesive 171 and the clearance for the adhesive 172 are connected to each other and form a space (clearance 175). In other words, the portable terminal device 1 uses the clearance 175 as a clearance for the adhesive to be pushed out of the adhesive surface 173 and also as a clearance for the adhesive to be pushed out of the adhesive surface 174. Accordingly, there is no need to provide clearances separately for the respective adhesive surfaces 173 and 174. Therefore, the number of manufacturing processes for the portable terminal device 1 can be reduced. Furthermore, since the side wall 112a is formed of the resin material, the molding process for the clearances is facilitated.

The side plate 113a has a first end 181 and a second end 182. The first end 181 is an end located on the display panel 14 side of the portable terminal device in the thickness direction of the housing 11. The second end 182 is an end opposite to the first end 181 (i.e., an end located on the back surface side of the housing 11).

The side plate 113a includes a curved portion 183. The curved portion 183 is formed in such a manner that the first end 181 is bent in a direction is opposed to the display panel 14 (toward the back surface side of the housing 11). That is, hemming processing is performed on the curved portion 183. Note that the first end 181 is located inside (clearance 175) of the portable terminal device 1.

The side plate 113a has a doubled-over portion where the side plate 113a is bent at the curved portion 183. The doubled-over portion of the side plate 113a has a strength higher than that of a portion where the side plate 113a is not doubled. The doubled-over portion is opposed to an end 142 of the display panel 14. Accordingly, in the portable terminal device 1, the strength against an external force applied to the end 142 of the display panel 14 can be improved.

At this time, the first end 181 is located on the display panel 14 side relative to the end 186 of the housing body 111. In other words, in the direction substantially perpendicular to the side wall 112a (in the right-left direction in FIG. 3), the doubled-over portion of the side plate 113a, which is formed by bending the side plate 113, and the rising portion of the housing body 111, which is directed upward toward display panel 14, do not overlap each other. Accordingly, even when the side plate 113a is formed in a doubled structure, the width of the portable terminal device 1 in the direction substantially perpendicular to the side wall 112 (the width of the portable terminal device 1 in the lateral direction) can be prevented from being increased.

In the thickness direction of the housing 11, the height of an apex 185 of the curved portion 183 is lower than the height of the surface (principal surface 100a) of the display panel 14. In other words, the apex 185 is located on the lower side (back surface side) shown in FIG. 4 relative to the surface of the display panel 14.

The side plate 113a includes a bent portion 184. The bent portion 184 is formed in such a manner that the second end 182, which is opposed to the first end 181, is bent toward the inside of the housing 11.

When the side plate 113a is bent at the bent portion 184, a part of the side plate 113a is substantially parallel to the display panel 14 and the housing body 111. Accordingly, in the portable terminal device 1, the strength against bending in the longitudinal direction of the portable terminal device 1 can be improved.

At this time, the second end 182 is located on the back surface side relative to the housing body 111. In other words, in the direction substantially perpendicular to the side wall 112a (in the right-left direction in FIG. 3), the rising portion of the housing body 111 and the second end 182 of the side plate 113a do not overlap each other. That is, the housing body 111 and the portion of the side plate 113a which is bent toward the inside of the housing 11 do not overlap each other. Accordingly, even when the side plate 113a is bent inward, the width of the portable terminal device 1 in the direction substantially perpendicular to the side wall 112 (the width of the portable terminal device 1 in the lateral direction) can be prevented from being increased.

The portable terminal device 1 includes the curved portion 183 and the bent portion 184 which are formed at the corner portions of the housing 11 which can be easily touched by the hand(s) of the user. Accordingly, when the user holds the portable terminal device 1, the user touches the curved portion 183 and the bent portion 184, each of which has a smooth curved shape. Therefore, the portable terminal device 1 provides a smooth texture.

<Comparison Between the Present Invention with a Portable Terminal Device of Related Art>

Figure 4:
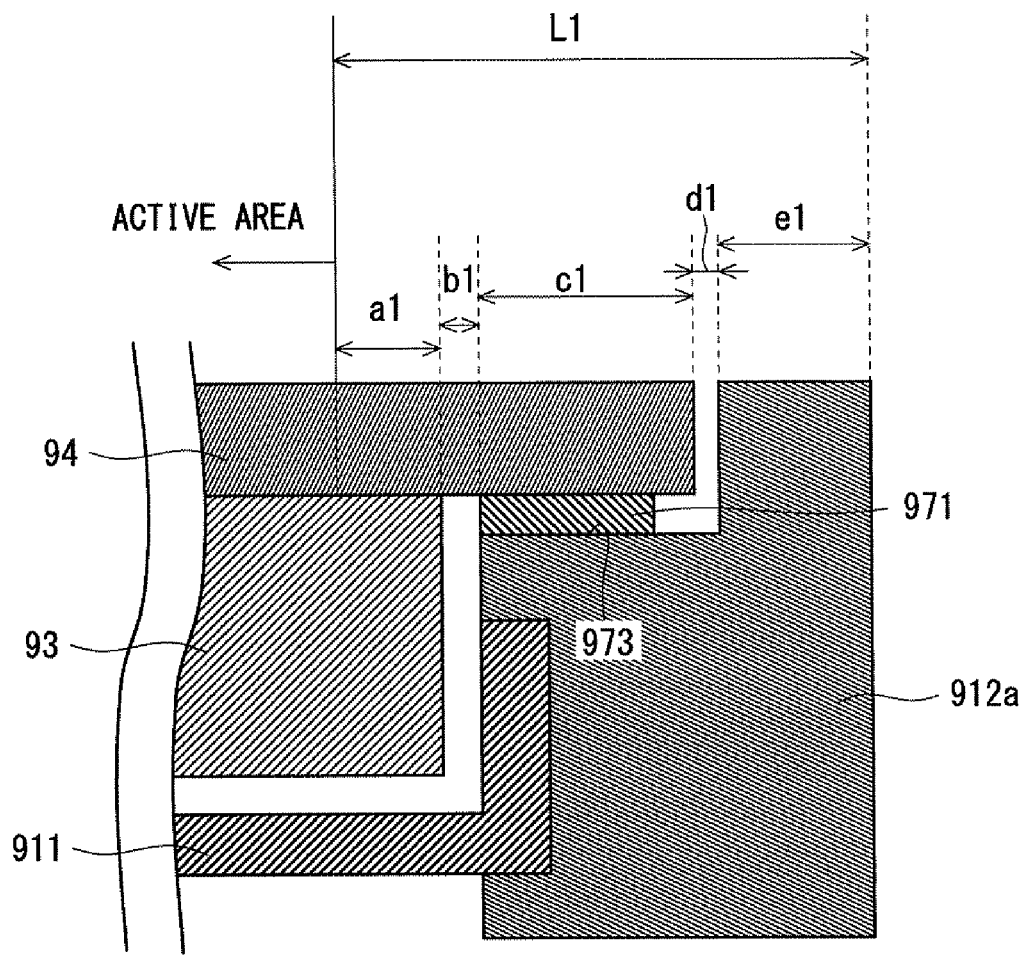
FIG. 4 is a diagram for explaining the width of a frame of a portable terminal device of related art.
Figure 5:
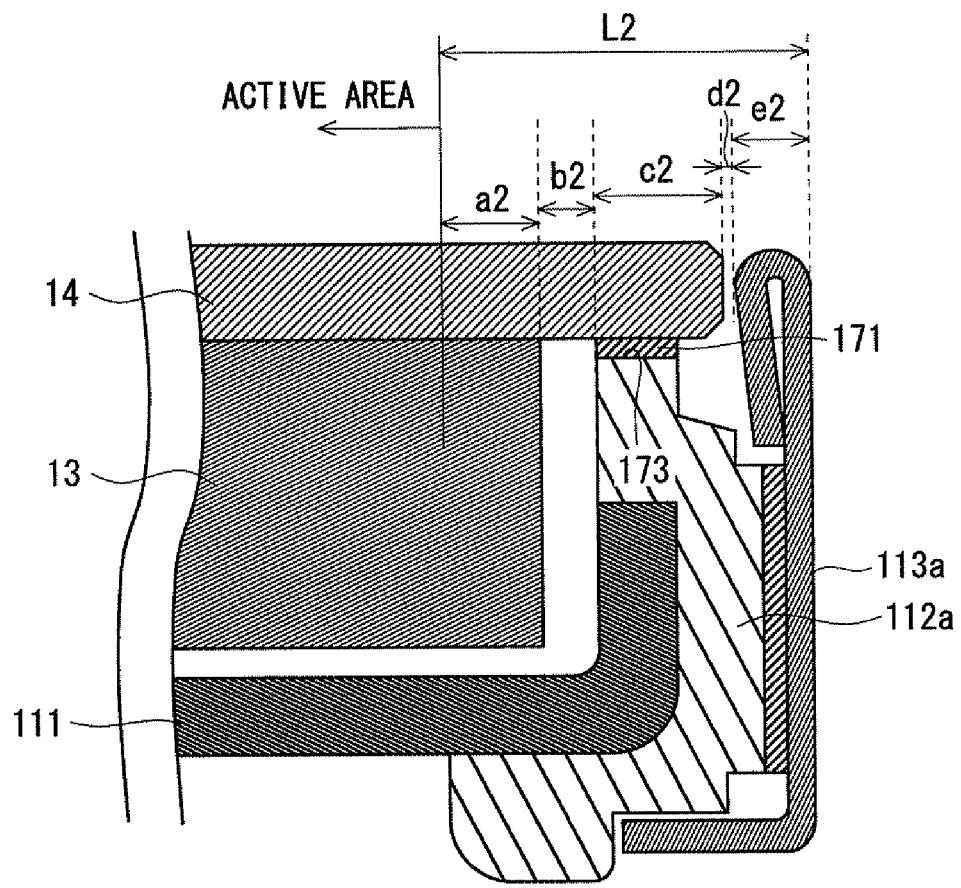
FIG. 5 is a diagram for explaining the width of the frame of the portable terminal device according to the first exemplary embodiment.

Differences in structure between the frame of the display unit of the portable terminal device 1 according to this exemplary embodiment and the frame of the display unit of the portable terminal device of the related art will now be described. FIG. 4 is a diagram for explaining the frame width of the portable terminal device of the related art. FIG. 5 is a diagram for explaining the frame width of the portable terminal device 1 according to this exemplary embodiment. FIG. 4 is a sectional view corresponding to the sectional view of FIG. 3. FIG. 5 is similar to the sectional view of FIG. 3.

First, the frame width of the portable terminal device of the related art will be described. The term "frame width" herein used refers to the distance from an end of an area (active area) in which an image is displayed on the display panel to a side surface of the portable terminal device. That is, the frame width corresponds to a distance L1 shown in FIG. 4.

The frame width L1 is equal to the total length of a width a1, a width b1, a width c1, a width d1, and a width e1. The width a1 corresponds to the distance from an end of the active area to an end of a liquid crystal portion 93. The width b1 corresponds to the distance from the liquid crystal portion 93 to a side wall 912a. In other words, the width b1 corresponds to the width of a clearance between the liquid crystal portion 93 and the side wall 912a. The side wall 912a is formed using a resin material. The width c1 corresponds to the distance from the clearance to an end of a display panel 94. The width d1 corresponds to the distance from the end of the display panel 94 to the side wall 912a. In other words, the width d1 corresponds to the width of a clearance between the display panel 94 and the side wall 912a. The width e1 corresponds to the distance from the clearance to the outer surface of the portable terminal device. In other words, the width e1 corresponds to the width of an exposed portion of the side wall 912a which is exposed toward the display panel 94.

The frame width of the portable terminal 1 according to this exemplary embodiment will now be described. The frame width of the portable terminal device 1 corresponds to a distance L2 shown in FIG. 5.

The frame width L2 is equal to the total length of a width a2, a width b2, a width c2, a width d2, and a width e2. The width a2 corresponds to the distance from an end of the active area to an end of the liquid crystal portion 13. The width b2 corresponds to the distance from the liquid crystal portion 13 to the side wall 112a. In other words, the width b2 corresponds to the width of the clearance between the liquid crystal portion 13 and the side wall 112a. The width c2 corresponds to the distance from the clearance to an end of the display panel 14. The width d2 corresponds to the distance from an end of the display panel 14 to the side wall 112a. In other words, the width d2 corresponds to the width of the clearance between the display panel 14 and the side wall 112a. The width e2 corresponds to the distance from the clearance to the outer surface of the portable terminal device 1. In other words, the width e1 corresponds to the width of an exposed portion of the side plate 113a which is exposed toward the display panel 14.

When the frame width L1 of the portable terminal device of the related art is compared with the frame width L2 of the portable terminal device 1 according to this exemplary embodiment, the following widths are common in both of the frame widths. The common widths are: the distance (width a1, a2) from an end of the active area to an end of the liquid crystal portion; the width (width b1, b2) of a clearance between the liquid crystal portion and the side wall; and the width (width d1, d2) of a clearance between the display panel and the side wall.

On the other hand, the following widths are different between the both frame widths. The different widths are: the distance (width c1, c2) from the clearance to an end of the display panel; and the distance (width e1, e2) from the clearance to the outer surface of the portable terminal device.

In the portable terminal device of the related art, a double-sided tape 971 is used to join the display panel 14 and the side wall 912a together. Accordingly, in order to obtain a sufficient adhesive force, the width of an adhesive surface 973 needs to be at least equal to or greater than the width of the double-sided tape.

The strength of a resin material is lower than that of a metal material. Accordingly, the side wall 912a having a thickness that is at least greater than the thickness of the metal material is required to protect the display panel 94 and the liquid crystal portion 93 against an external force.

On the other hand, in the portable terminal device 1 according to this exemplary embodiment, a liquid or gel adhesive is used instead of the double-sided tape to join the display panel 14 and the side wall 112a together. Accordingly, the width of the adhesive surface 173 need not necessarily be equal to or greater than the width of the double-sided tape. That is, the width of the adhesive surface 173 may be narrower than that of the adhesive surface 973 shown in FIG. 4. In other words, in the portable terminal device 1, the width c2 can be set to be smaller than the width c1. Therefore, in the portable terminal device 1 according to this exemplary embodiment, a frame width narrower than that of the portable terminal device shown in FIG. 4 can be achieved.

Further, since the strength of a metal material is higher than that of a resin material, the strength of the side plate 113a which is equivalent to the strength of the side wall 912a can be ensured even when the width of the side plate 113a is smaller than that of the side wall 912a shown in FIG. 4. That is, in the portable terminal device 1, the width e2 can be set to be smaller than the width e1. Therefore, in the portable terminal device 1 according to this exemplary embodiment, a frame width narrower than that of the portable terminal device shown in FIG. 4 can be achieved.

As described above, the portable terminal device 1 according to this exemplary embodiment includes a side plate which is made of a metal member and disposed on a first side surface (side wall 112a) of the housing. Accordingly, the portable terminal device 1 can maintain the same strength as that of the portable terminal device in which a resin material is disposed on the side surface thereof. Additionally, in the portable terminal device 1, the frame width of the display unit can be narrowed as compared with the portable terminal device in which the resin material is disposed on the side surface thereof. Thus, in the portable terminal device 1 according to this exemplary embodiment, a narrower frame width can be achieved while the strength of the portable terminal device is ensured.

Furthermore, the portable terminal device 1 includes the resin material disposed at the ends of the housing, which sandwich the respective side surfaces on which the side plates 113a and 113b are disposed, in the longitudinal direction of the side surface (first side surface) on which the corresponding one of the side plates 113a and 113b is disposed. The portable terminal device 1 also includes the antenna areas 114a and 114b at the ends thereof. In the portable terminal device 1, the peripheral area of the antenna areas 114a and 114b is formed using the resin material, instead of using the metal material, thereby suppressing deterioration in the communication quality of the antenna.

Modified Example

Figure 6:
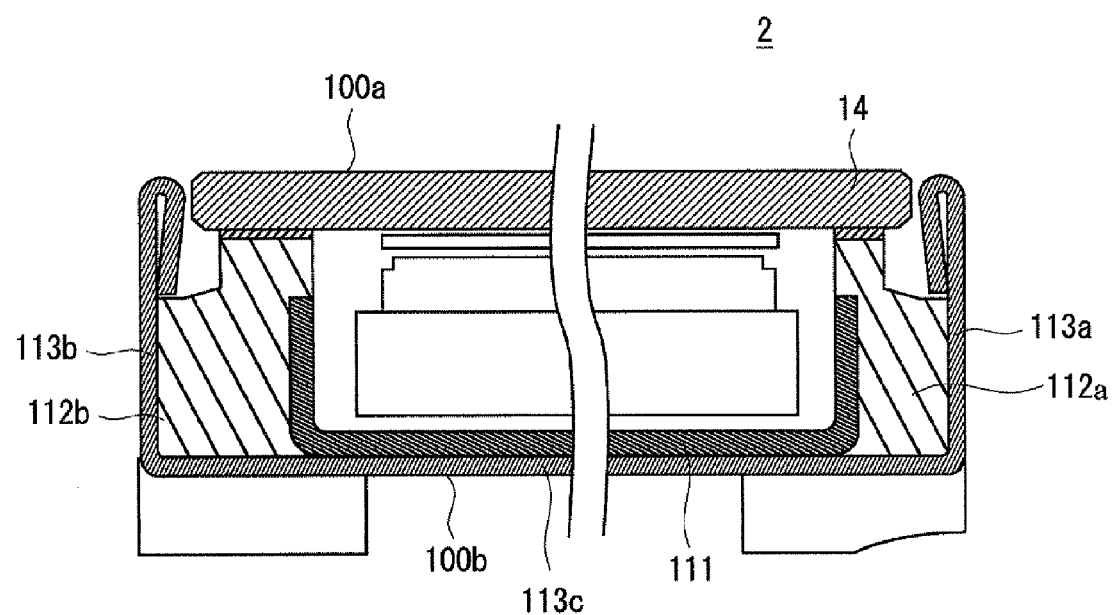
FIG. 6 is a sectional view showing a portable terminal device according to a modified example.

A modified example of this exemplary embodiment will be described. FIG. 6 is a sectional view showing a portable terminal device 2 according to the modified example in the lateral direction. The structure of the portable terminal device 2 according to the modified example is similar to that of the portable terminal device 1 described above, except for the structures of the side plates 113a and 113b and a back plate 113c. Accordingly, a detailed description thereof is omitted as needed.

The portable terminal device 2 includes the side plate 113a disposed on a side surface of the side wall 112a. The portable terminal device 2 also includes the side plate 113b disposed on a side surface of the side wall 112b. Thus, the portable terminal device 2 includes the side plates 113a and 113b disposed on both side surfaces thereof in the lateral direction. Accordingly, as described above, in the portable terminal device 1, the frame width of the display panel 14 on both sides thereof in the lateral direction can be reduced.

Further, the portable terminal device 2 includes the back plate 113c which extends from the side plate 113a to the side plate 113b on a back surface 100b (second surface) which is opposed to the principal surface 100a. In other words, the back plate 113c is a member that connects the side plate 113a with the side plate 113b to each other. The back plate 113c is formed integrally with the side plate 113a and the side plate 113b. The back plate 113c is formed using a metal material, as with the side plates 113a and 113b.

The back plate 113c is located outside the housing body 111 (insert metal plate). Accordingly, the back plate 113c is exposed on the back surface 100b of the portable terminal device 2.

The back plate 113c is preliminarily welded to the housing body 111, instead of being joined to the housing body 111 with an adhesive. As a result, the back plate 113c is integrated with the housing body 111. Then the integrated back plate 113c and housing body 111 are integrated with the resin material by insert molding. This eliminates the need for performing insert molding on each of the back plate 113c and the housing body 111. Accordingly, it is only necessary to carry out the insert molding process once. Thus, in the portable terminal device 2, the number of manufacturing processes can be reduced.

The thickness of the housing body 111 is reduced by the amount corresponding to the thickness of the back plate 113c. Accordingly, the portable terminal device 2 can suppress an increase in the thickness thereof.

As described above, the portable terminal device 2 according to the modified example includes the back plate 113c, which extends from the side plate 113a to the side plate 113b, on the back surface 100b which is opposed to the principal surface 100a. Accordingly, on the back surface side of the portable terminal device 2, the housing body 111, which is formed of an insert metal plate, and the back plate 113c, which is formed of a metal material, are formed in layers. Consequently, the portable terminal device 2 can improve the strength against bending.

Second Exemplary Embodiment

Figure 7:
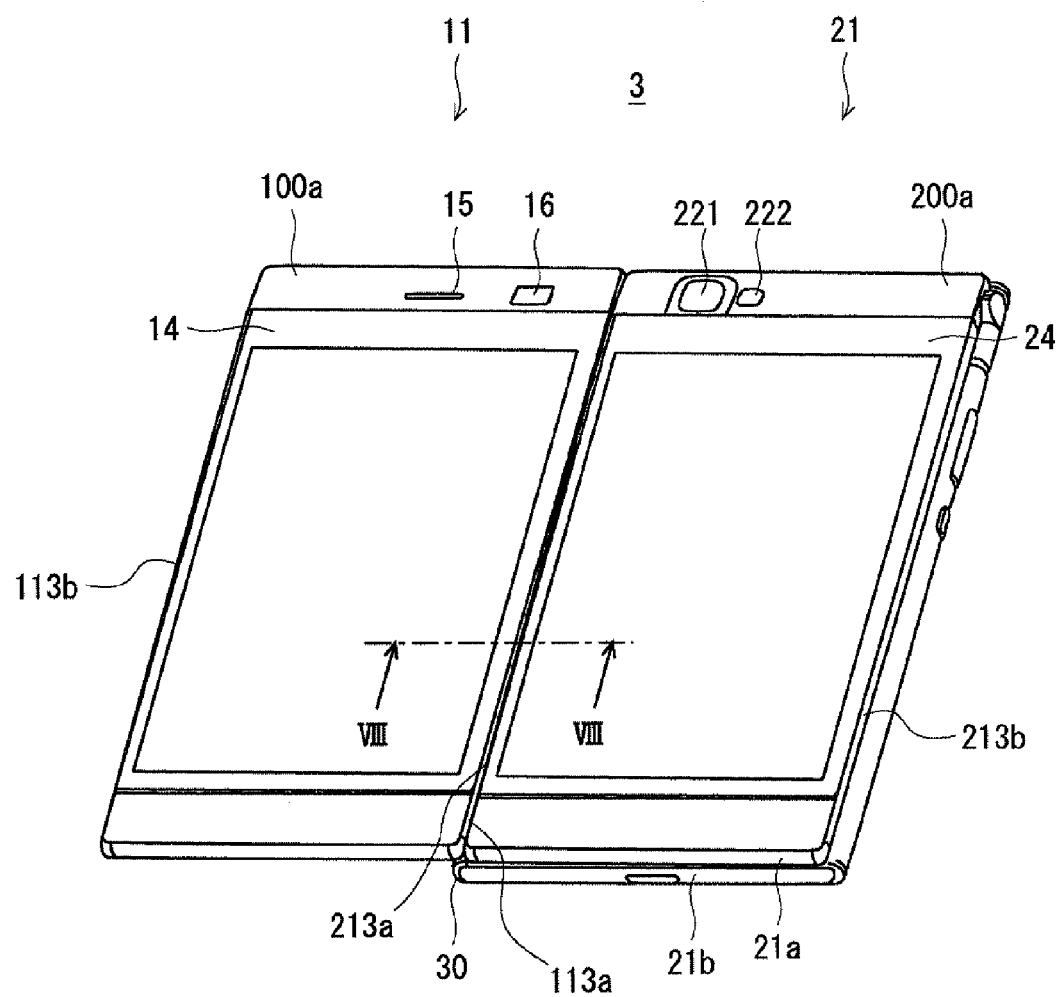
FIG. 7 is a perspective view showing the appearance of a portable terminal device according to a second exemplary embodiment in a closed state.

A second exemplary embodiment of the present invention will be described. FIG. 7 shows a perspective view showing the appearance of a portable terminal device 3 according to this exemplary embodiment. The portable terminal device 3 includes a first housing 11, a second housing 21, and a hinge 30.

<Overall Structure of Portable Terminal Device 3>

The first housing 11 corresponds to the portable terminal device 1 according to the first exemplary embodiment described above. Specifically, the first housing 11 includes the display panel 14. The first housing 11 also includes the side plates 113a and 113b which are formed on both side surfaces of the portable terminal device in the lateral direction and are formed using a metal material. The first housing 11 is formed using a resin material. The first housing 11 differs from the portable terminal device 1 in that the first housing 11 does not include the substrate and the battery.

On the other hand, the second housing 21 includes an upper housing 21a and a lower housing 21b. The upper housing 21a has a structure similar to that of the first housing 11. That is, the upper housing 21a includes a display panel 24. The upper housing 21a includes side plates 214a and 213b which are formed on both side surfaces thereof in the lateral direction and are formed using the metal material. The upper housing 21a and the lower housing 21b are formed using the resin material. The upper housing 21a also includes a camera 221 and a flash 222.

The second housing 21 includes the lower housing 21b on a surface opposite to the display panel 24 of the upper housing 21a. The lower housing 21b is formed integrally with the upper housing 21a, and accommodates a substrate and a battery (not shown).

The hinge 30 (connecting portion) connects the first housing 11 and the second housing 21 to each other in an openable/closable manner. More specifically, the hinge 30 connects the first housing 11 and the upper housing 21a to each other via a rotation axis in an openable/closable manner. In other words, the hinge 30 connects the first housing 11 and the upper housing 21 to each other in such a manner that the portable terminal device 3 can be changed from a closed state (first state) to an open state (second state), or from the open state (second state) to the closed state (first state). In the closed state, the hinge 30 connects the principal surface 100a of the first housing 11 and a principal surface 200a of the upper housing 21a to each other in such a manner that the principal surfaces 100a and 200a face outward. In other words, the hinge 30 connects, in the closed state, the first housing 11 and the upper housing 21a to each other in such a manner that the principal surfaces 100a and 200a face in opposite directions. Further, the hinge 30 allows the first housing 11 and the upper housing 21a to rotate relatively to each other about the rotation axis so that the portable terminal device can be changed from the closed state (first state) to the open state (second state). The hinge 30 holds the first housing 11 and the upper housing 21a in the closed state, and also holds the first housing 11 and the upper housing 21a in the open state. FIG. 7 shows the open state of the portable terminal device 3.

<Detailed Structure of Connecting Portion>

Figure 8:
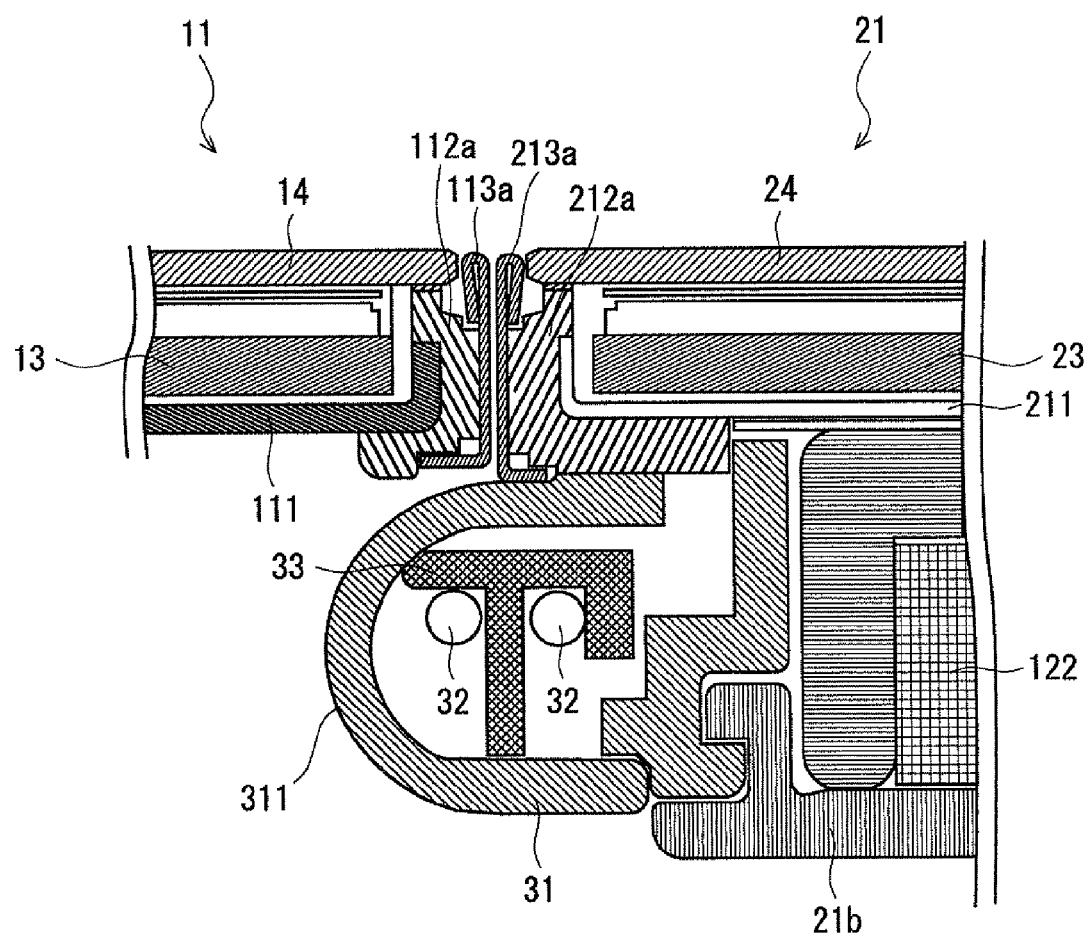
FIG. 8 is a sectional view showing the portable terminal device according to the second exemplary embodiment in the closed state.

Next, the detailed structure of the connecting portion between the first housing 11 and the second housing 21 will be described. FIG. 8 is a sectional view taken along the line VIII-VIII of FIG. 7. The structure of the first housing 11 is similar to the structure shown in FIG. 5, and thus the description thereof is omitted. The structure of the upper housing 21a is also similar to the structure of the first housing 11. Specifically, a liquid crystal portion 23 and the display panel 24 are located on a housing body 211. A side wall 212a located on the first housing 11 side of the upper housing includes a side plate 213a on the first housing 11 side of the upper housing.

As shown in FIG. 8, when the portable terminal device 3 is in the open state, the side surface located on the upper housing 21a side of the first housing 11 and the side surface located on the first housing 11 side of the upper housing 21a are opposed to each other. Specifically, the side plate 113a and the side plate 213a are opposed to each other. As described above, the portable terminal device 3 includes the side plate 113a, which contributes to a reduction in the frame width. That is, the portable terminal device 3 also includes the side plate 213a disposed on the upper housing 21a, which contributes to a reduction in the frame width of the upper housing 21a. Thus, the opposed frames of the respective housings are narrowed.

Figure 9:
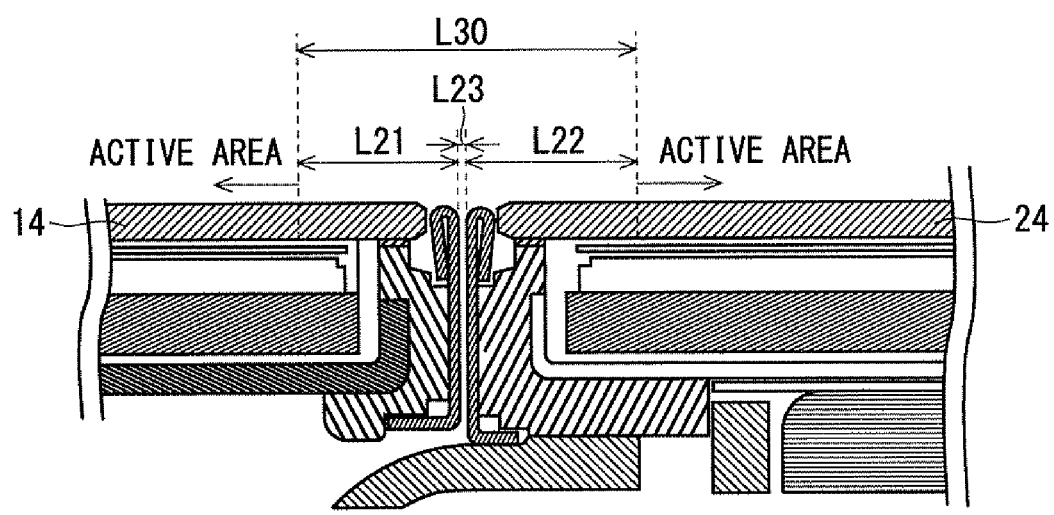
FIG. 9 is an enlarged sectional view showing the portable terminal device according to the second exemplary embodiment in the closed state.

Referring to FIG. 9, a distance from an end of the active area of the display panel 14 to an end of the active area of the display panel 24 (the distance is hereinafter referred to as "inter-screen distance") will be described. FIG. 9 is an enlarged view showing the vicinity of the side plates 113a and 213a shown in FIG. 8.

Referring to FIG. 9, a distance L30 represents the inter-screen distance. The distance L30 corresponds to the total of distances L21, L22, and L23. The distance L21 is a distance from an end of the active area in the first housing 11 to a side surface of the first housing 11. The distance L22 is a distance from an end of the active area in the second housing 21 to a side surface of the upper housing 21a. The distance L23 corresponds to the width of a clearance between the first housing 11 and the upper housing 21a. Since the housings respectively include the side plates 113a and 213a, a narrower frame width is achieved as described in the first exemplary embodiment. Specifically, the distance L21 and the distance L22 are smaller than those in the portable terminal device of the related art. As a result, the portable terminal device 3 can reduce the distance L30 and also reduce the inter-screen distance.

Returning to FIG. 8, the lower housing 21b is connected to the housing body 211 (upper housing 21a). The lower housing 21b accommodates the battery 122 and the substrate (not shown).

The portable terminal device 3 includes a hinge cover 31 which is disposed on the back surface of the upper housing 21a and is located on the first housing 11 side of the portable terminal device 3 relative to the lower housing 21b. The hinge cover 31 is connected to the hinge 30. Lines 32 pass through the inside of the hinge cover 31. A cable frame 33 supports the lines 32.

Since the illustration of the hinge 30 is omitted in the sectional view of FIG. 8, it appears that the first housing 11 and the upper housing 21a are not connected to each other. However, in other longitudinal sections of the side plates 113a and 213a, the hinge 30 connects the first housing 11 and the upper housing 21a to each other. Accordingly, when the portable terminal device 3 transitions from the open state shown in FIG. 8 to the closed state, the first housing 11 and the upper housing 21a rotate relatively to each other. Specifically, the first housing 11 rotates along an outer surface 311 of the hinge cover 31 about the rotation axis. Thus, in the closed state, the back surface (housing body 111) of the first housing 11 and the back surface (lower housing 21b) of the second housing 21 are opposed to each other in the thickness direction of the portable terminal device 3.

As described above, the portable terminal device 3 according to this exemplary embodiment includes the first housing 11 and the second housing 21. The first housing 11 includes the side plate 113a which is disposed on the side surface at the second housing 21 side of the first housing 11 and is formed of the metal material. Similarly, the second housing 21 includes the side plate 213a which is disposed on the side surface at the first housing 11 side of the second housing 21 and is formed of the metal material. Accordingly, in the portable terminal device 3, the frame width of each of the display units can be reduced. This leads to a reduction in the inter-screen distance. As a result, even when the user uses the display unit of the first housing 11 and the display unit of the second housing 21 as a single large screen, the user can view moving images (or images) to be displayed, without a sense of discomfort.

In this exemplary embodiment, the hinge 30 connects the first housing 11 and the second housing 21 to each other in an openable/closable manner. Therefore, the portable terminal device 3 can achieve an increase in the screen size by using two display units during viewing of moving images and the like, while achieving downsizing by changing the portable terminal device 3 to the closed state when the user carries the portable terminal device 3 with him/her.

Further, as described in the first exemplary embodiment, in the thickness direction of the first housing 11, the height of the apex 185 of the curved portion 183 of the side plate 113a is lower than the height of the surface of the display panel 14 (see FIG. 4). Similarly, also in the second housing 21, the height of the apex of the curved portion of the side plate 213a is lower than the height of the surface of the display panel 24. That is, in the open state, the apexes of the curved portions of the side plates 113a and 213a on the display panel side of the portable terminal device are located on the back surface side of the portable terminal device relative to the display panels 14 and 24. In other words, in a plane formed by the surfaces of the display panels 14 and 24, portions corresponding to the side plates 113a and 213a are recessed from the surfaces of the display panels 14 and 24. Accordingly, even when the user operates the touch panel with fingers in such a manner that the fingers move across the border between the display panel 14 and the display panel 24 during a touch panel operation, the side plates 113a and 213a do not hinder the operation. Consequently, the user can perform the touch panel operation without a sense of discomfort.

While the present invention has been described above with reference to the exemplary embodiments, the present invention is not limited only to the structures of the above exemplary embodiments. Various modifications, corrections, and combinations that can be made by those skilled in the art within the scope of claims of the present invention are also included in the scope of the present invention.

This application is based upon and claims the benefit of priority from Japanese patent application No. 2012-211290, filed on Sep. 25, 2012, the disclosure of which is incorporated herein in its entirety by reference.

REFERENCE SIGNS LIST 1-3 PORTABLE TERMINAL DEVICE
11 HOUSING (FIRST HOUSING)
13, 23 LIQUID CRYSTAL PORTION
14, 24 DISPLAY PANEL
15 RECEIVER
16 PROXIMITY SENSOR
21 SECOND HOUSING
30 HINGE
31 HINGE COVER
32 LINE
33 CABLE FRAME
111, 211 HOUSING BODY
112a-112d, 212a SIDE WALL
113a, 113b, 213a SIDE PLATE
113c BACK PLATE
114a, 114b ANTENNA AREA
121 SUBSTRATE
122 BATTERY
141 ACTIVE AREA
142 END
171, 172 ADHESIVE
173, 174 ADHESIVE SURFACE
175, 176 CLEARANCE
181, 182 END
183 CURVED PORTION
184 BENT PORTION
185 APEX
186 END
221 CAMERA
222 FLASH

What is claimed is:

1. A portable terminal device comprising:
a housing;
a display unit disposed on a first surface of the housing;
a first member disposed on a first side surface of the housing; and
a second member disposed at ends of the housing, the ends sandwiching the first side surface in a longitudinal direction of the first side surface,
wherein the first member has a strength higher than that of the second member,
the housing includes a side wall formed of the second member,
the side wall is joined to the first member with an adhesive, and
a first clearance is present between the first member and the side wall, the first clearance being on at least one of both sides of an adhesive surface between the first member and the side wall.

2. The portable terminal device according to claim 1, wherein the first member is disposed on a portion of the first side surface, the portion corresponding to the display unit.

3. The portable terminal device according to claim 2, further comprising an antenna disposed on at least one of the ends of the housing relative to the display unit,
wherein the second member is disposed on a portion of the first side surface, the portion corresponding to the antenna.

4. The portable terminal device according to claim 3, wherein
the first member includes a metal material as a major component, and
the second member includes a resin material as a major component.

5. The portable terminal device according to claim 4, wherein
the first member has a flat plate shape, and
the first member includes a first curved portion, the first curved portion being bent in such a manner that a first end of the first member located on the display unit side faces in a direction opposite to the display unit side in a thickness direction of the housing.

6. The portable terminal device according to claim 5, wherein a height of an apex of the first curved portion in the thickness direction of the housing is lower than a height of a display surface of the display unit.

7. The portable terminal device according to claim 6, wherein the first member includes a second curved portion, the second curved portion being bent in such a manner that a second end of the first member faces an inside of the housing, the second end being opposite to the first end.

8. The portable terminal device according to claim 1, wherein
the display unit is joined to the side wall with an adhesive in a thickness direction of the housing, and
a second clearance is present between the display unit and the side wall, the second clearance being on the first member side relative to an adhesive surface between the display unit and the side wall.

9. The portable terminal device according to claim 8, wherein
the first clearance is present on the display unit side relative to an adhesive surface between the first member and the side wall in a thickness direction of the housing, and
the first clearance and the second clearance are connected to each other.

10. The portable terminal device according to claim 9, further comprising the first member on a second side surface, the second side surface being opposite to the first side surface.

11. The portable terminal device according to claim 10, wherein the first member extends from the first side surface to the second side surface on a second surface of the housing, the second surface being opposite to the first surface.

12. A portable terminal device comprising:
at least two portable terminal devices according to claim 11; and
a connecting portion that connects one of the portable terminal devices to another one of the portable terminal devices,
wherein the connecting portion connects the one portable terminal devices to the other portable terminal device in such a manner that the first side surface of the one portable terminal device is opposable to the first side surface of the other portable terminal device.

13. The portable terminal device according to claim 12, wherein the connecting portion connects the one portable terminal device to the other portable terminal device via a rotation axis, and the first surface of the one portable terminal device and the first surface of the other portable terminal device are directed outward when both of the portable terminal devices are in at least a first state.

* * * * *